United States Patent [19]
Thompson et al.

[11] Patent Number: 5,293,320
[45] Date of Patent: Mar. 8, 1994

[54] MEASUREMENT OF SHOT PEENING COVERAGE BY IMPACT DENT CHARACTERIZATION

[75] Inventors: Robert A. Thompson, Quaker Street; Mark A. Tascillo, Endicott, both of N.Y.

[73] Assignee: General Electric Company, Schenectady, N.Y.

[21] Appl. No.: 850,732

[22] Filed: Mar. 13, 1992

[51] Int. Cl.⁵ ............................................... B24C 1/10
[52] U.S. Cl. .................................. 364/474.02; 72/53
[58] Field of Search ........... 364/472, 473, 552, 474.02, 364/474.36; 72/53; 51/410, 415, 416

[56] References Cited

U.S. PATENT DOCUMENTS

| | | | |
|---|---|---|---|
| 4,974,434 | 12/1990 | Reccius et al. | 72/53 |
| 5,003,805 | 4/1991 | Thompson | 72/53 |
| 5,113,680 | 5/1992 | Matsuura et al. | 72/53 |
| 5,166,885 | 11/1992 | Thompson | 364/473 |
| 5,172,580 | 12/1992 | Thompson | 72/53 |
| 5,176,018 | 1/1993 | Thompson | 72/53 |
| 5,204,826 | 4/1993 | Thompson et al. | 364/552 |
| 5,212,976 | 5/1993 | Company | 72/53 |
| 5,235,517 | 8/1993 | Thompson et al. | 364/148 |

OTHER PUBLICATIONS

"Effect of Partial-Coverage Upon the Fatigue Fracture Behavior of Peened Components" to S. A. Meguid, Fatigue Fract. Engng. Mater. Struct., vol. 14, No. 5, pp. 515–530, 1991.

*Primary Examiner*—Jerry Smith
*Assistant Examiner*—Brian C. Oakes
*Attorney, Agent, or Firm*—Paul R. Webb, II

[57] ABSTRACT

This invention relates to measuring shot peening coverage by impact dent characterization. Such methods of this type employ a non-destructive, automated computer analysis by analyzing dent characteristics to determine shot coverage of a particular surface.

2 Claims, 9 Drawing Sheets

DETECTING DIMPLES ON A MACHINED/PEENED SURFACE

SHOT VELOCITY - 720 in/sec
ALMEN NO. - 14.2A
COVERAGE - 40%

MEASURMENT OF SHOT PEENING COVERAGE BY IMPACT DENT CHARACTERIZATION

BACKGROUND OF THE INVENTION

1. Field of the Invention

This invention relates to measuring shot peening coverage by impact dent characterization. Such methods of this type, generally, employ a non-destructive, automated computer analysis by analyzing dent characteristics to determine shot coverage of a particular shot peened surface.

2. Description of the Related Art

Under normal shot peening conditions, it is desirable to expose the substrate or work surface to the shot stream for a sufficient time to achieve 100% surface coverage, i.e. sufficient exposure to fully cover the surface with impact dimples. Insufficient coverage has obvious adverse consequences. If the local compressive zones due to individual shot strikes do not merge into a continuum that fully covers the surface with a compressive layer, locally unprotected regions will exist where surface flaws can grow into cracks.

On the other hand, shot peening related damage is not necessarily caused only by broken or deformed shot, but rather excessive cold work may play a significant part in the damage process. The cold work sustained by the material is a function of both coverage and intensity, as well as, shot size. To minimize damage due to excessive cold work, or prevent overly worked parts from entering service, it is desirable to measure the coverage. Furthermore, for uniform flat surfaces it is relatively easy to set and control the exposure time needed to maintain the desired coverage condition. However, on surfaces with features, such as inside corners where reflections cause multiple strikes, it may be difficult to avoid excessive coverage, in some cases to the point where surface distress may occur.

Therefore it is apparent that two key drivers govern the shot peening process. They are intensity, or the impact energy of individual shot particles and coverage, or the way individual strikes add to fully cover the surface with a compressive residual stress layer. What makes coverage so important is that inadequate coverage can lead to gaps in the surface compressive layer, while excessive coverage or repeated beating can cause surface distress and cracking.

It is known, in prior non-destructive evaluation techniques (NDE), that a ratio of the total area of shot impact dents to the area of the peened surface can be used to detect coverage. Exemplary of such prior art is entitled "Effect of Partial-Coverage Upon the Fatigue Fracture Behavior of Peened Components" to S. A. Meguid, *Fatigue Fract. Engng. Mater. Struct.*, Vol. 14, No. 5, pp. 515-530, 1991. By its very nature, this method is limited to measuring only up to 100% coverage or the time when 100% of the surface has been impacted. Therefore, a more advantageous system, then, would be presented if the system were based on the total number of strikes which would be valid for overlapping dimples and consequently sensitive to coverage percentages well above 100%, say to 1000%.

It is apparent from the above that there is a need in the art for a shot peening coverage system which detects the amount of coverage of the shot peening operation and which detects the amount of shot peening coverage in a non-destructive manner, but which at the same time is capable of detecting the amount of shot peening coverage well above 100% coverage. It is a purpose of this invention to fulfill this and other needs in the art in a manner more apparent to the skilled artisan once given the following disclosure.

SUMMARY OF THE INVENTION

Generally speaking, this invention fulfills these needs by providing a method for measuring shot peening coverage having a substrate including a first side which has been surface treated by a shot peening operation, comprising the steps of measuring a predetermined area of said surface treatment on said first side to obtain profile data, recording said profile data, identifying impact dents data in said predetermined area, filtering said impact dent data to select at least one predetermined dent size and dent shape, determining an actual shot peening coverage in said predetermined area, and adjusting, if needed, said surface treatment so that the actual coverage of a subsequently formed surface treated area is substantially in conformance with a predetermined desired coverage.

In certain preferred embodiments, the filtering step identifies and catalogs size size data that shows closed contours on the peened surface which get larger with increasing elevation, such as, cavities. With respect to shape data, the filtering step sorts out peening induced surface features from others such as open machining contours then catalogs them. Also, the shot peening coverage step is performed by determining the number of dents per unit area identified in the predetermined area which have not been filtered out and using the statistics coverage to determine how this density is related to coverage. The statistic relate to the fact that as more and more shot rains down on the surface, increasing overlap reduces the ability to resolve new strikes.

In another further preferred embodiment, the amount of shot peening coverage on a particular area of a surface treated substrate can be accurately determined well above 100% coverage in a non-destructive manner.

The preferred measurement system, according to this invention, offers the following advantages: ease of use; excellent measurement characteristics; good stability; good durability; good economy; and increased range of coverage measurement. In fact, in many of the preferred embodiments, these factors of ease of use, measurement characteristics, and range of coverage measurement are optimized to an extent considerably higher than heretofore achieved in prior, known shot peening coverage measurement systems.

BRIEF DESCRIPTION OF THE DRAWINGS

The above and other features of the present invention which will become apparent as the description proceeds are best understood by considering the following detailed description in conjunction with the accompanying drawings wherein like characters represent like parts throughout the several views and in which.

DETAILED DESCRIPTION OF THE INVENTION

Figure 1:
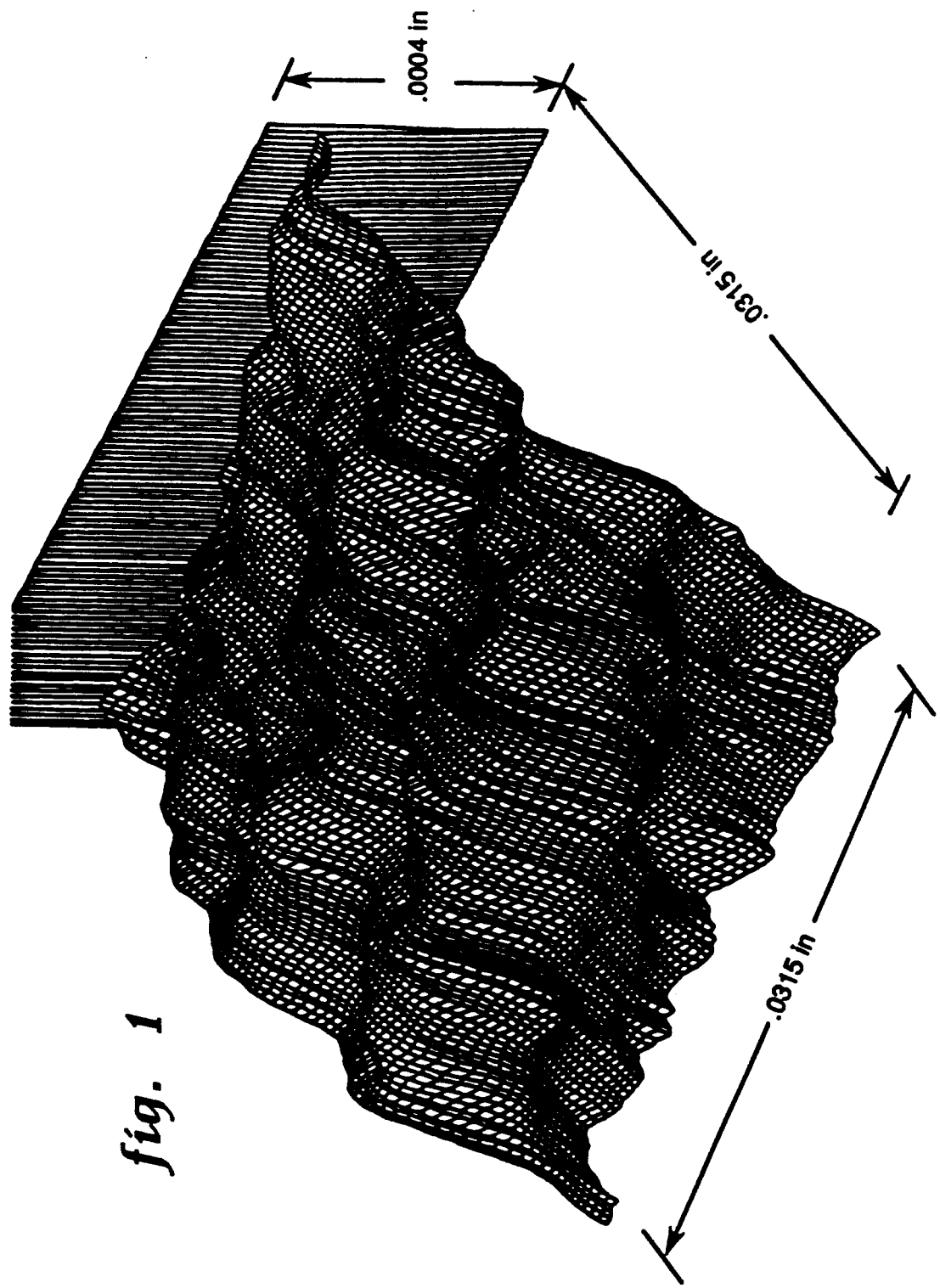
FIG. 1 is a 3-D profilogram of a shot peened surface.
Figure 2A:
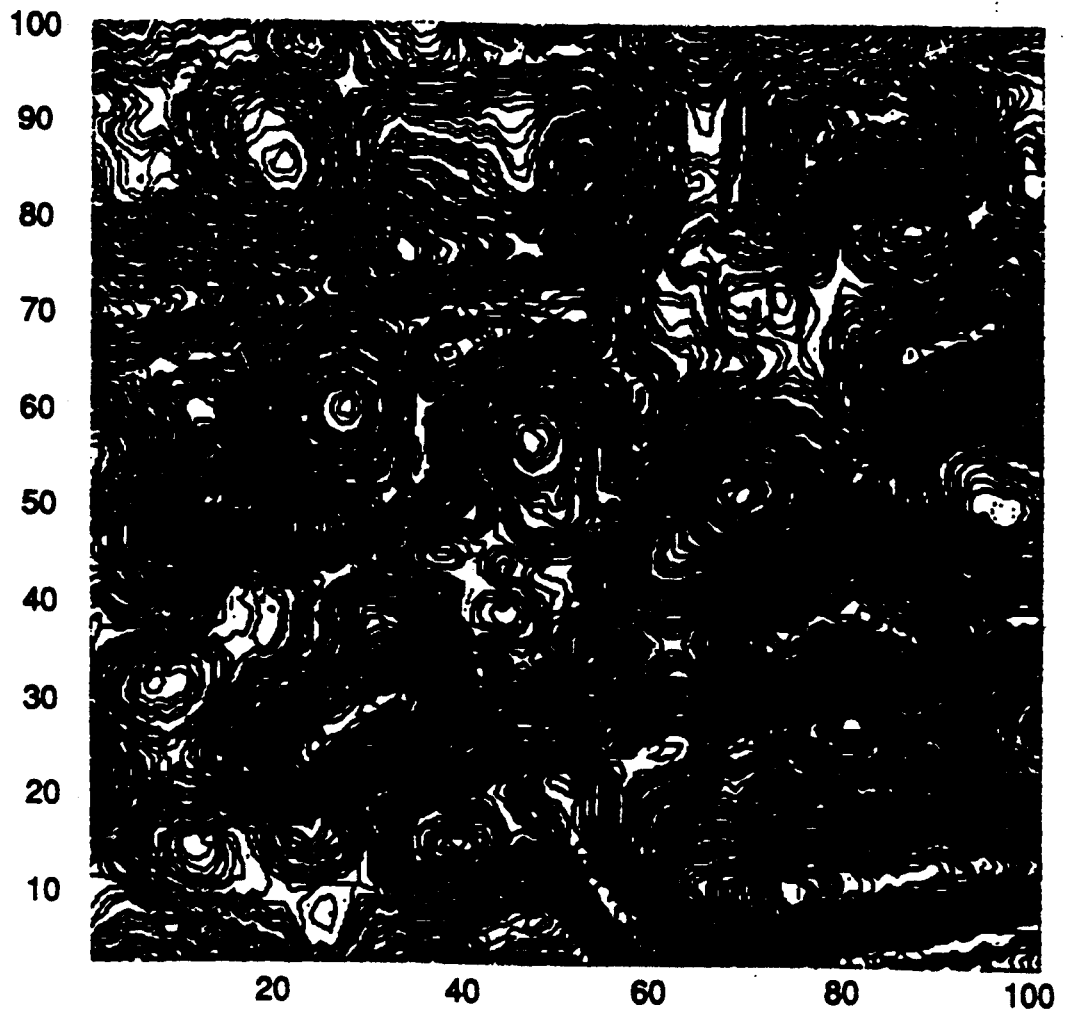
FIG. 2A is a contour plot generated from the data shown on FIG. 1.

With reference first to FIG. 1, FIG. 1 shows a 3-D profile of a peened surface measured, preferably, by a TENCOR P-1 Long Scan Profiler, manufactured by Tencor Instruments, Inc. and recorded by conventional recording techniques on a conventional magnetic disk. The grid sectors are approximately 0.0003 inches on a side. Next, a well-known routine of the Pro MatLab computer software which runs on VMS generates a contour plot of the data as shown in FIG. 2A. The software identifies closed contours which get larger with increasing elevation such as cavities. Note, contours enclose progressively smaller areas with elevation if the surface feature is a mound.

Figure 2B:
FIG. 2B contour plot of FIG. 2A after features not related to shot impacts has been eliminated.

Finally, after cavities have met the size constraints appropriate for impact dimples, they must meet shape constraints, as well. For example, circular contours would indicate spherical cavities typical of last strikes, or in the case of overstruck dimples, distorted contours, such as ellipsoids, etc., or truncated spheres would be permitted. Basically, this selection process sorts out peening induced surface features from others such as open machining contours, etc. The result of this selection process applied to FIG. 2A is shown in FIG. 2B.

Figure 3:
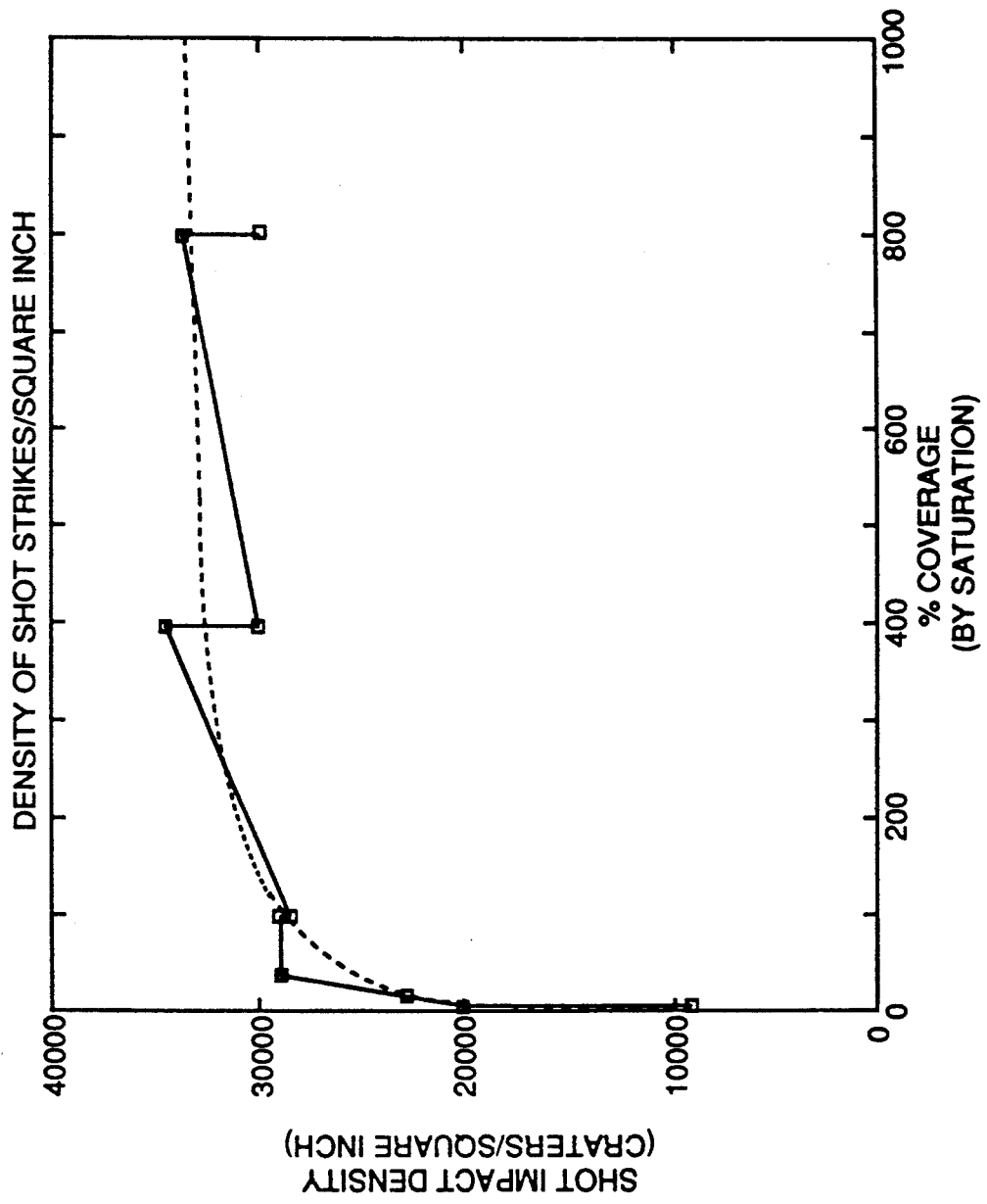
FIG. 3 is a graphical representation of coverage by fractual analysis of FIGS. 4-7 where dimple density (dimples per square inch) is plotted against coverage (%)

The computer software identifies impact dents in the grid sector, be they due to strikes which have been partially obliterated by subsequent impacts or last strikes. The total number of dents identified in the specified area is then used to determine the shot impact density (craters/in$^2$). The number density of impact craters is related to the actual coverage by the coverage algorithm as illustrated in FIG. 3. FIG. 3 shows the impact crater density measured by the dent selection process applied to shot peened samples for which the coverage was carefully controlled. 3-D profilograms of several of these samples are shown in FIGS. 4-7, representing coverage amounts of from 10% to 800% of the coverage needed for saturation. The stepwise linear curve in FIG. 3 is based on these dimple density measurements, while the smooth, dotted curve is based on the coverage algorithm as described in subsequent paragraphs.

Figure 4:
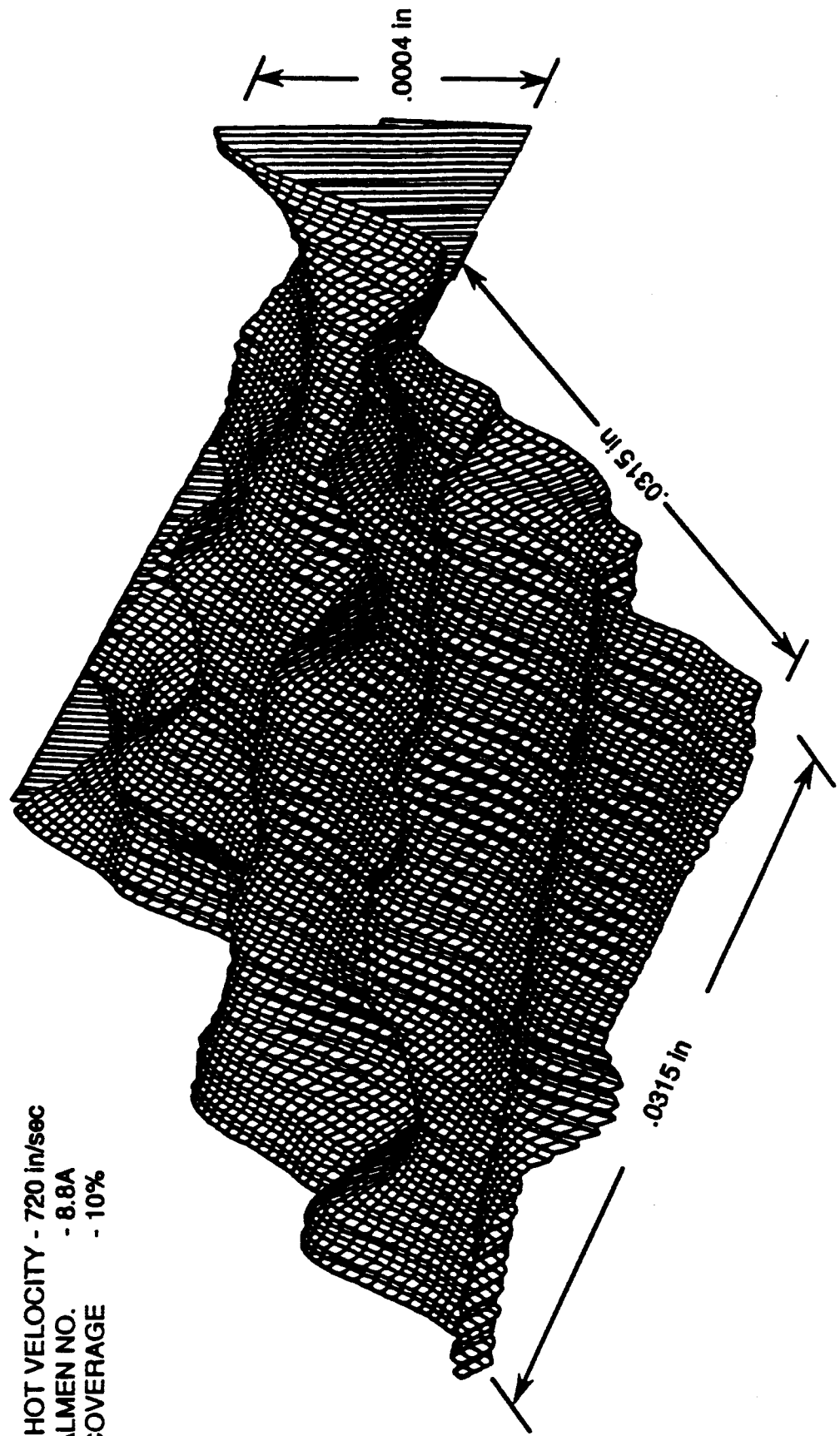
FIGS. 4-7 are 3-D profilograms of shot peened surfaces.
Figure 5:
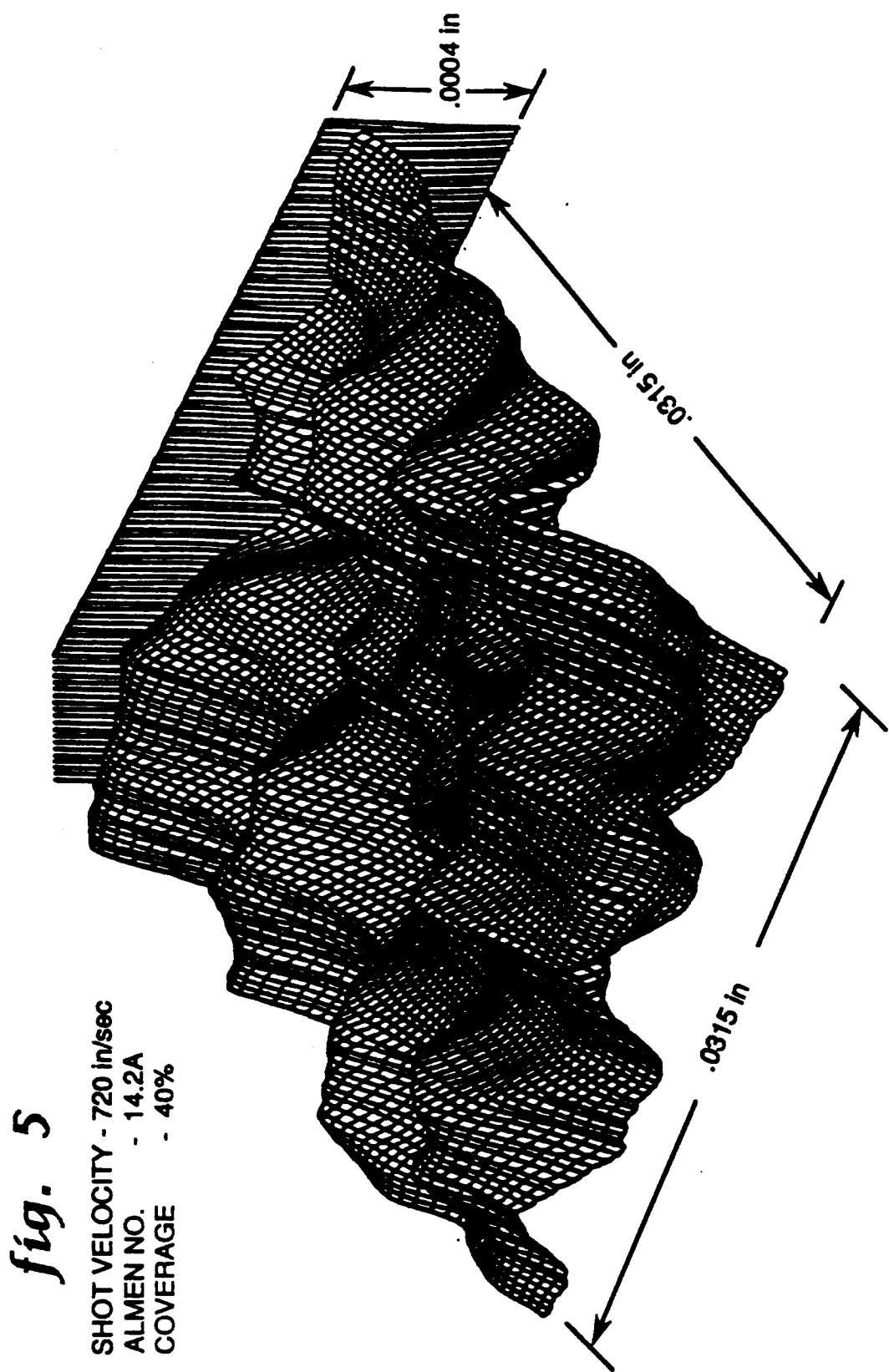
Figure 6:
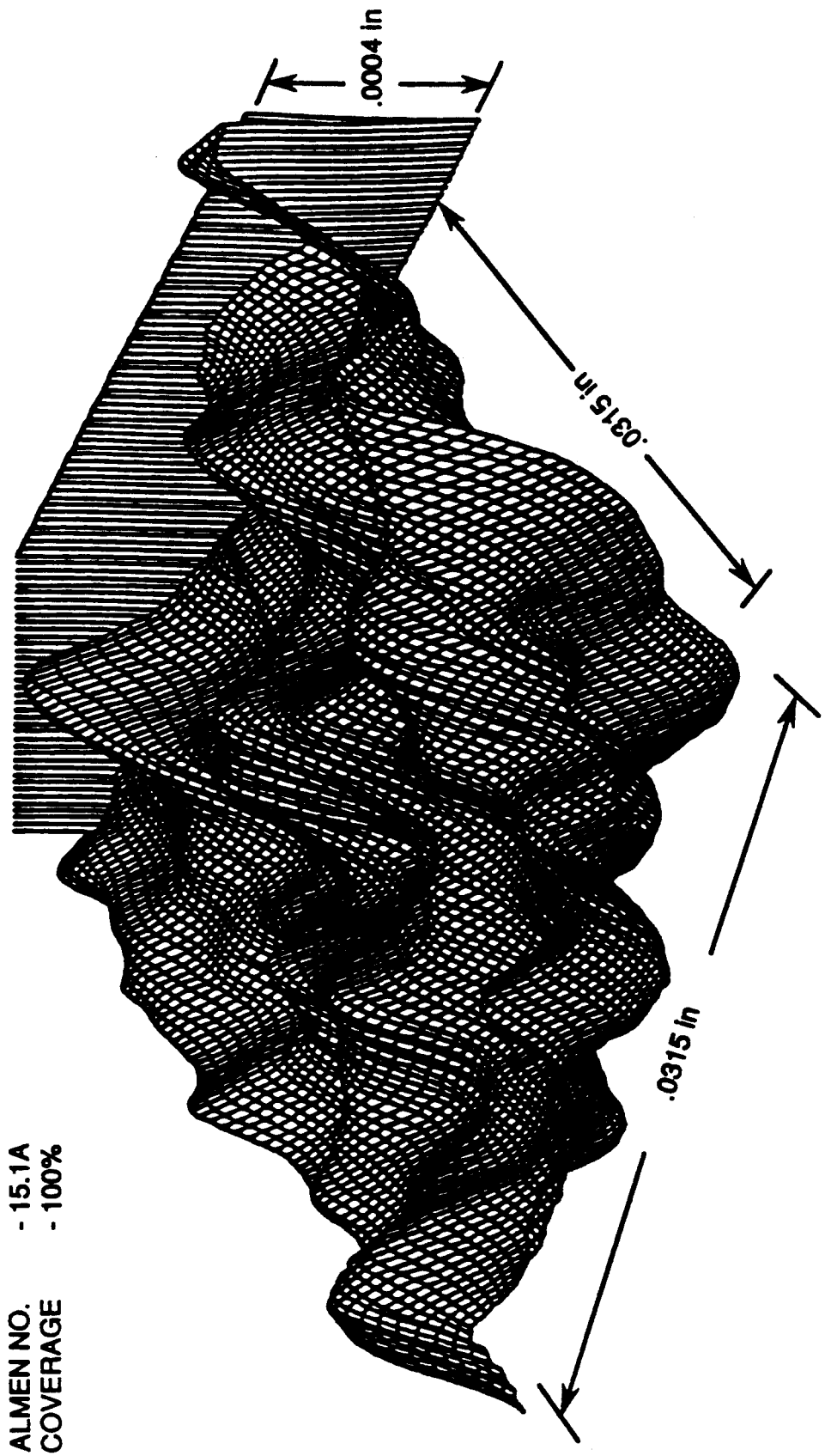
Figure 7:
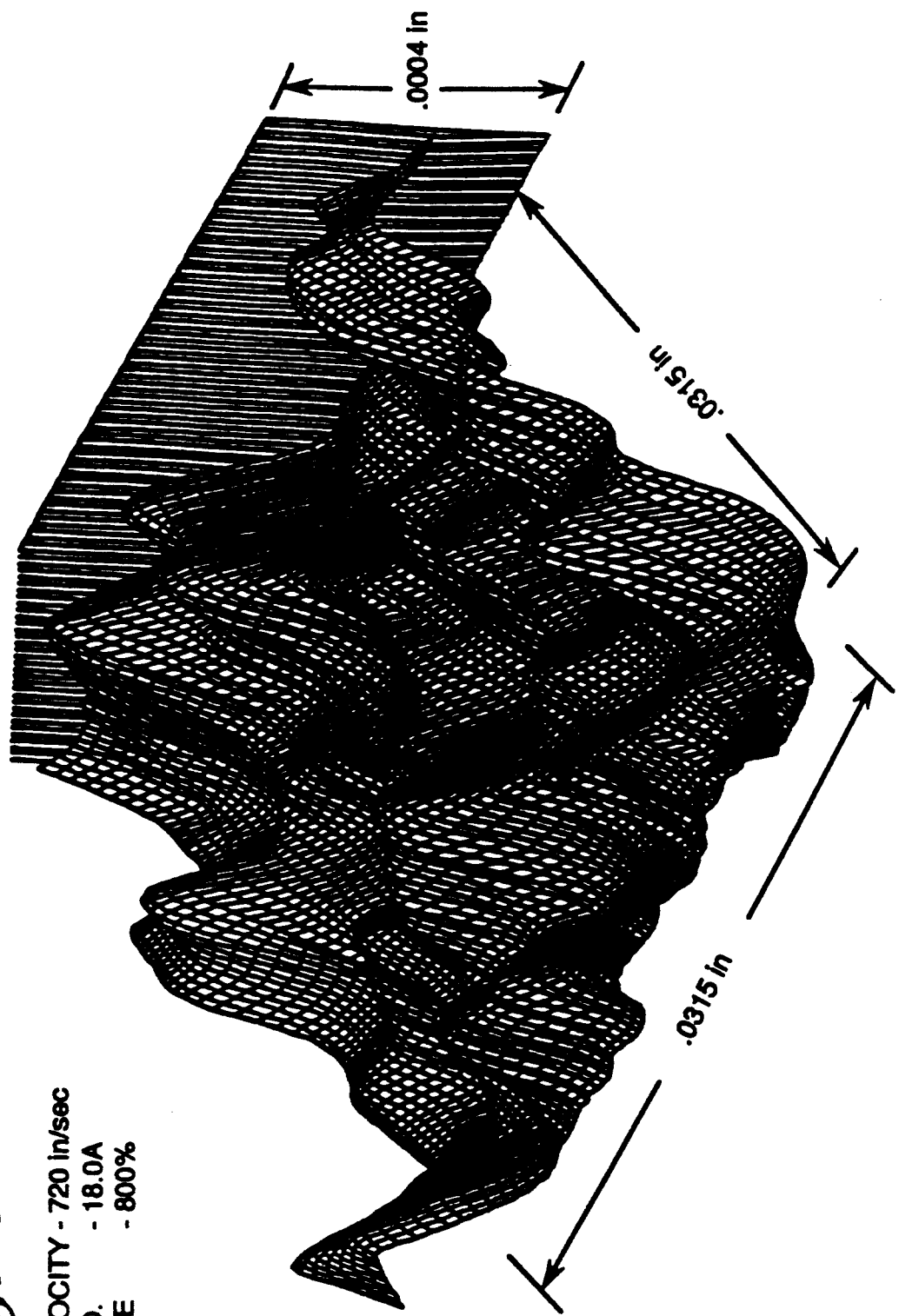

As shown in FIG. 3, both the measured and calculated curves initially rise rapidly, but as coverage increases, the rise is slower. This occurs because at the initiation of peening individual dents are unlikely to coincide and are therefore easily identified (FIG. 4). Here the number density of distinguishable dents increases nearly linearly with coverage. As coverage increases, however, the dents start to overlap more and more, and the resolvable number increases more slowly. This is an obvious effect because a ball landing near the center of a previous crater will not produce a new indication and the likelihood of such an event increases with the number of craters. This diminishing detectability continues until somewhere between 400% and 800% of saturation new strikes become nearly indistinguishable.

Since saturation coverage is the basis for peening time in FIG. 3 it is important to understand the significance of saturation. Saturation is that coverage for which an Almen strip's (a strip used traditionally to measure peening intensity) arc height will not increase more than 10% when the peening time is doubled.

The Almen arc height depends on the added effect of the surface compression due to individual strikes. It is therefore sensitive to intensity (the magnitude of individual strikes) and coverage (the number of dents) until saturation is reached. At saturation the strip has been fully covered with dents and is thus sensitive only to intensity. Any further bending of the strip under continued peening is due to other effects such as work hardening.

In coverage measurement it is important to know how many strikes are needed to reach this saturation point. Obviously, since the strikes occur in a random fashion more are needed than just the number of strikes times the dimple area to fully cover an area. The needed number can be determined by statistical analysis as follows.

Tables 1 and 2, respectively, describe the accumulation of coverage as a function of the number of strikes. The solution for coverage in terms of number of strikes is found by integrating the coverage rate of change equation (Table 1).

TABLE 1

| Coverage statistics |
|---|
| $\psi = 1 - a/A$ = probability a strike will produce new area |
| $a = \Sigma A_i$ = total dimpled area (in$^2$) |
| $A_i$ = dimple area (in$^2$) |
| $\dot{N} = \dot{n}A$ = number rate of particle incident on the area element, A (particles/sec.) |
| $\dot{n}$ = particle number rate density (particles/sec./in$^2$) |
| $A$ = Area element |
| Coverage rate of change: $da/dt = \psi \dot{N} A_i = (1 - a/A)\dot{N}A_i$ (Eq. 1) |
| Coverage versus time: $a/A = 1 - e^{-(A_i\dot{N}/A)t}$ (Eq. 2) |
| Coverage versus number of strikes: $a/A = 1 - e^{-A_iN/A}$ (Eq. 3) |

Equation 3 states that the rate of change of coverage area is the product of the probability that a strike will be in an uncovered spot times the number rate of strikes time the area of a dimple. Table 2 shows the results of the integration. It shows total dimple area (area per crater times number of strikes) per unit surface area, A, compared with the actual covered area, a, per unit area, A.

TABLE 2

| Coverage versus number of strikes: $a/A = 1 - e^{-A_iN/A}$ | |
|---|---|
| Area of strike ratio: ($A_iN/A$) | Coverage ratio: (a/A) |
| 0 | 0 |
| .1 | .095 |
| .2 | .18 |
| .3 | .26 |
| .4 | .33 |
| .5 | .39 |
| .6 | .45 |
| .7 | .50 |
| .8 | .55 |
| .9 | .59 |
| 1.0 | .63 |
| 1.5 | .78 |
| 2.0 | .86 |
| 3.0 | .95 Saturation |
| 5.0 | .99 |
| 10.0 | .9999 |

Since saturation is defined as the point where the doubling of the peening time does not lead to a greater than 10% increase in Almen intensity, it is clear from Table 2 that at saturation, the part has seen a cumulative dimple area of 2.3 times that needed to cover it. Thus, on average, the part has been struck 2.3 times and at 1/2.3 of saturation time well placed strikes could fully cover the part. This is the reason for the sharp decrease in the slope of FIG. 3 after 40% coverage. Also, it is important to note that a coverage of two times saturation (200%) means that on average each point on the surface has been struck 4.6 times. This has significance as regards ductility exhaustion and dangerous embrittlement of the workpiece surface. Consider this in light of FIG. 3 which shows the detected dimple density from measured parts versus percent of saturation coverage. At 400% of saturation each point on the part surface has been struck $4 \times 2.3 = 9.2$ times.

As discussed earlier, FIG. 3 shows measured data points connected by a piecewise straight line and a smooth, dotted curve which closely approximates the data. As mentioned the smooth curve is derived from the coverage algorithm. The algorithm is based on an understanding of the peening process and is derived as follows.

The algorithm must have the following features based on known coverage relationships. It must be:

Linear near 0% coverage and rise sharply with coverage.

The dimple density at 0% coverage must be zero.

The dimple density at 43% coverage, when the number of strikes times the dimple area is sufficient to dimple the entire surface. (i.e. $\frac{1}{2.3}$ of saturation), must closely approximate the reciprocal $$\left( \frac{1}{\text{dimple area}} = \text{dimples/inch}^2 \right)$$

After saturation the dimple density increases more and more slowly with peening time.

The algorithm must closely approximate measured dimple densities.

An algorithm which has all those features can be described by the simple exponential mathematical expression:

$$p = \frac{Ax}{1 + Bx^n} \quad \text{(Eq. 4)}$$

where $p$ is the dimple density, x is the decimal coverage (% coverage/100), and A,B, and n are constants. This expression is zero when $x=0$ and is linear for small values of x. If n is less than 1 it curves sharply as the coverage approaches 100% and rises more and more slowly thereafter.

The constants A,B, and n can be calculated from three measured dimple densities. For this example they are taken from experimental points of FIG. 3:

| % coverage (by saturation) | dimple density, $p$ (dimples/in$^2$) |
|---|---|
| 5% | 9400 |
| 100% | 28800 |
| 400% | 32300 |

From this information A,B, and n are calculated by substituting x and f into Eq. 4 for three experimental points. An example of one substitution is $$9400 = \frac{.05A}{1 + .05^n B} \quad \text{(Eq. 5)}$$

The values of the constants A,B, and n thus determined are:

A = 273900
B = 8.5
n = 0.9758

So when applying Eq. 4, the coverage algorithm becomes $$p = \frac{273990x}{1 + 8.5x^{.9758}} \quad \text{(Eq. 6)}$$

This equation is plotted as the smooth, dotted line of FIG. 3.

Once the algorithm is known, the coverage for a given dimple density, $p$, can be calculated by using Eq.6 to determine x for that density. In this way, surface dimple density information can be used to determine coverage well above 100% of saturation to about 400% of saturation or on average $4.00 \times 2.3 = 9.12$ strikes at each point on a surface. Thus, the average number of strikes at each point on a surface can be determined and for the reasons mentioned earlier, part quality can be assured.

It is clear that more precise coverage algorithms could be determined or that simple curve fitting routines and graphical methods could be used for specific cases without changing the intent of this disclosure. It is also clear that the accuracy of the method will improve as the size of the experimental data bank increases. The method described here has the advantage that it leads to better understanding of the coverage process and that a coverage versus dimple density curve can be established for only 3 well chosen coverage data points and then applied on parts in general.

Figure 8:
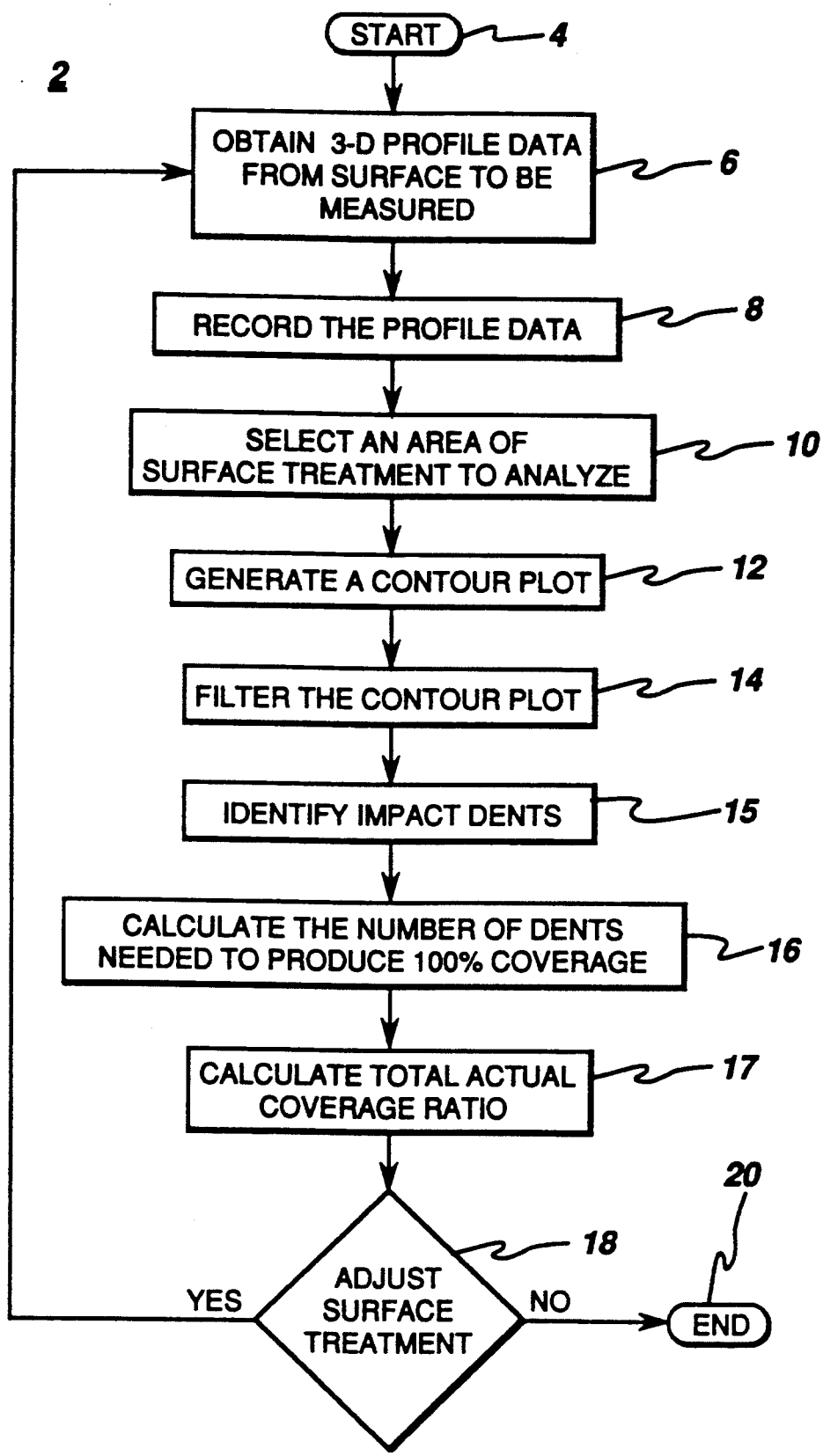
FIG. 8 is a flowchart illustrating a sequence of method steps, in accordance with the present invention.

To determine the shot peening coverage, in accordance with the present invention, after a workpiece surface has been peened, a system user initiates the process which is briefly illustrated as a flow diagram 2 in FIG. 8. The system user may, for example, be a human or a computer including a computer-controlled robotic unit. Specifically referring to flowchart 2, after the process has been initiated as indicated at start block 4, the system user obtains a 3-D profile of the workpiece surface to be measured as indicated at block 6. The profile may be obtained by several conventional means such as an optical means or by a high resolution profilometer recorder which records surface height along many closely spaced lines. The profiled data is then recorded by conventional recording techniques on conventional magnetic disks as shown in block 8. The recorded data is broken down into grid sections which are approximately 0.0003 inches on a side as shown in block 10. From the selected grids, a routine generates a contour plot of the data as shown in block 12. The software also filters the contour plot data to filter out predetermined size and shape constraints as shown in block 14. Next, the software identifies impact dents as shown in block 15. The coverage ratio is calculated as shown in block 17 by taking the number of dents needed to produce 100% coverage as shown in block 16 and dividing the number of dents with the total number of dents identified in a specific area from block 15. The total actual coverage ratio from block 17 is compared with the desired coverage ratio to determine, if any, adjustments should be made to the surface treatment operation as indicated at block 18 and 20.

Once given the above disclosure, many other features, modifications and improvements will become apparent to the skilled artisan. Such features, modification and improvements are, therefore, considered to be part of this invention, the scope of which is to be determined by the following claims.

What is claimed is:

1. A method for measuring shot peening coverage having a substrate including a first side which has been surface treated by a shot peening operation, said method comprising the steps of:
   measuring a predetermined area of said surface treatment on said first side to obtain profile data;
   recording said profile data;
   identifying impact dent data in said predetermined area;
   filtering said impact dent data to select at least one predetermined dent size and dent shape;
   calculating A,B,n, according to the equation $$\rho = \frac{Ax}{1 + Bx^n}$$

where $\rho$=dimple density (dimples/in$^2$) and x=coverage by comparing $\rho$ and x for at least three separate points;
   calculating $\rho$ for a predetermined shot density;
   determining actual shot peening coverage in said predetermined area; and
   adjusting, if needed, said surface treatment so that the actual coverage of a subsequently formed surface treated area is substantially in conformance with a predetermined desired coverage.

2. A method for measuring shot peening coverage having a substrate including a first side which has been surface treated by a shot peening operation, said method comprising the steps of:
   measuring a predetermined area of said surface treatment on said first side to obtain profile data;
   recording said profile data;
   identifying impact dent data in said predetermined area;
   filtering said impact dent data to select at least one predetermined dent size and dent shape;
   plotting a $\rho$ determination for a predetermined number of shot peening coverages where $\rho$=dimple density (dimples/in$^2$);
   establishing a $\rho$ versus x curve where x is said shot peening coverage;
   comparing at least one additional $\rho$ of a substrate which has been subsequently surface treated against said $\rho$ versus x curve to determine shot peening coverage (x) for said substrate which has been subsequently surface treated;
   determining an actual shot peening coverage in said predetermined area; and
   adjusting, if needed, said surface treatment so that the actual coverage of a subsequently formed surface treated area is substantially in conformance with a predetermined desired coverage.

* * * * *